US011144296B2

(12) United States Patent
Rodriguez Bravo et al.

(10) Patent No.: US 11,144,296 B2
(45) Date of Patent: Oct. 12, 2021

(54) MULTI-VARIABLE BASED SECURE DOWNLOAD OF VEHICLE UPDATES

(71) Applicant: International Business Machines Corporation, Armonk, NY (US)

(72) Inventors: Cesar Augusto Rodriguez Bravo, Alajuela (CR); John R. Feezell, Pikeville, TN (US); Edgar A. Zamora Duran, Santo Domingo (CR)

(73) Assignee: International Business machines Corporation, Armonk, NY (US)

( * ) Notice: Subject to any disclaimer, the term of this patent is extended or adjusted under 35 U.S.C. 154(b) by 375 days.

(21) Appl. No.: 16/121,699

(22) Filed: Sep. 5, 2018

(65) Prior Publication Data

US 2020/0073651 A1 Mar. 5, 2020

(51) Int. Cl.
*G06F 8/65* (2018.01)
*H04L 29/08* (2006.01)
*H04L 9/32* (2006.01)
*H04L 9/06* (2006.01)
*H04W 4/40* (2018.01)

(52) U.S. Cl.
CPC .............. *G06F 8/65* (2013.01); *H04L 9/0637* (2013.01); *H04L 9/3236* (2013.01); *H04L 67/12* (2013.01); *H04L 67/34* (2013.01); *H04W 4/40* (2018.02); *H04L 2209/38* (2013.01)

(58) Field of Classification Search
CPC . G06F 8/65; H04L 67/34; H04L 67/12; H04L 9/3236; H04L 9/0637; H04L 2209/38; H04W 4/40
See application file for complete search history.

(56) References Cited

U.S. PATENT DOCUMENTS

| | | | |
|---|---|---|---|
| 8,719,592 B2 | 5/2014 | Spaur | |
| 8,856,869 B1 | 10/2014 | Brinskelle | |
| 9,464,905 B2 | 10/2016 | Lewis | |
| 2004/0093155 A1 | 5/2004 | Simonds | |
| 2005/0120106 A1 | 6/2005 | Albertao | |
| 2014/0109075 A1 | 4/2014 | Hoffman | |
| 2015/0169311 A1* | 6/2015 | Dickerson | G06F 8/65 717/170 |
| 2016/0013934 A1* | 1/2016 | Smereka | H04L 9/32 713/171 |
| 2016/0364225 A1* | 12/2016 | Moeller | G06F 16/24568 |

(Continued)

OTHER PUBLICATIONS

"Automated Driving: Legislative and Regulatory Action", CyberWiki, This page last modified on Apr. 27, 2017, at 14:48, 16 pages, <https://cyberlaw.stanford.edu/wiki/index.php/Automated_Driving:_Legislative_and_Regulatory_Action>.

(Continued)

*Primary Examiner* — Donald J Wallace
(74) *Attorney, Agent, or Firm* — David K. Mattheis; Maeve M. Carpenter

(57) ABSTRACT

In a computer implemented approach for securely updating vehicle software the computer monitors data associated with a vehicle, determines that a software update is necessary, requests validation of a software update, receives validation of the software update from the network, updates the vehicle software with the received software update, receives an updated blockchain ledger entry associated with the vehicle, and utilizes the updated vehicle software to control the vehicle.

20 Claims, 5 Drawing Sheets

(56) References Cited

U.S. PATENT DOCUMENTS

| | | | |
|---|---|---|---|
| 2018/0048473 A1* | 2/2018 | Miller | H04L 9/3247 |
| 2018/0074811 A1* | 3/2018 | Kiyama | H04L 67/10 |
| 2019/0245680 A1* | 8/2019 | Boutaba | G06F 21/64 |
| 2019/0384587 A1* | 12/2019 | Rao | G06F 9/445 |
| 2020/0042012 A1* | 2/2020 | Zander | G05D 1/0276 |

OTHER PUBLICATIONS

"Autonomous Vehicle Information Library", AAMVA, 2 pages, printed on Jun. 25, 2018, <https://www.aamva.org/Autonomous-Vehicle-Information-Library/>.

"Autonomous Vehicles | Self-Driving Vehicles Enacted Legislation", National Conference of State Legislatures, May 21, 2018, 13 pages, <http://www.ncsl.org/research/transportation/autonomous-vehicles-self-driving-vehicles-enacted-legislation.aspx>.

"Defining the Legal Guidelines, Rules and Regulations for Autonomous Vehicles", Autonomous Vehicle Safety Regulation World Congress 2018, to be held Oct. 23-25, 2018, The Suburban Collection Showplace, Novi, MI, USA, <http://www.autonomousregulationscongress.com/en/>.

Groll et al., "Next Generation of Automotive Security: Secure Hardware and Secure Open Platforms", retrieved from the internet on Jun. 22, 2018, 7 pages, <http://citeseerx.ist.psu.edu/viewdoc/download?doi=10.1.1.849.4619&rep=rep 1&type=pdf>.

Healey, Jennifer, "If cars could talk, accidents might be avoidable", TED Talk, Video, Apr. 2013, 4 pages, <https://www.ted.com/talks/jennifer_healey_if_cars_could_talk_accidents_might_be_avoidable>.

Lucas, Matt, "The difference between Bitcoin and blockchain for business", IBM, Blockchain Unleashed: IBM, May 9, 2017, 8 pages, <https://www.ibm.com/blogs/blockchain/2017/05/the-difference-between-bitcoin-and-blockchain-for-business/>.

Phung et al., "A Model for Safe and Secure Execution of Downloaded Vehicle Applications", Road Transport Information and Control Conference and the ITS United Kingdom Members' Conference (RTIC 2010)—Better transport through technology, IET, 2010, 6 pages, <https://ieeexplore.ieee.org/document/5549229/>.

Reisinger, Don, "What Intel's $15.3 Billion Mobileye Buyout Means for Self-Driving Cars", eWeek, Mar. 14, 2017, 14 pages, <http://www.eweek.com/mobile/what-intel-s-15.3-billion-mobileye-buyout-means-for-self-driving-cars?dni=400899683&mi=22926116&utm_campaign=EWK_NL_EP_20170315_STR1L2&utm_medium=email>.

Urmson, Chris, "How A Driverless Car Sees The Road", TED Talk, Video, Mar. 2015, 4 pages, <https://www.ted.com/talks/chris_urmson_how_a_driverless_car_sees_the_road>.

* cited by examiner

MULTI-VARIABLE BASED SECURE DOWNLOAD OF VEHICLE UPDATES

BACKGROUND

The invention relates generally to the field of secure software updates and particularly to the field of multi-variable based secure vehicle software downloads.

The control systems of vehicles utilize software in managing engine performance and other functions of the vehicles. This software may require updates over the service life of the vehicle to address issues with the software or changes to regulations which need to be reflected in vehicle performance.

The development of autonomous vehicles expands the scope of what such software controls to include steering, acceleration and braking, driving speed, and other decisions formerly made by the human driver. As control shifts from the human to the vehicle, regulations regarding vehicles will also shift from prescribing human activities to prescribing software content. Regulations may change over time and may vary from one geographic area to another requiring vehicular systems to implement updates as they become available and as the vehicle transitions between areas having differing sets of regulations.

SUMMARY

Aspects of the invention include methods, systems and computer readable media for securely updating vehicle software wherein a computer the computer monitors data associated with a vehicle, determines that a software update is necessary, requests validation of a software update, receives validation of the software update from the network, updates the vehicle software with the received software update, receives an updated blockchain ledger entry associated with the vehicle, and utilizes the updated vehicle software to control the vehicle.

DETAILED DESCRIPTION

Figure 1:
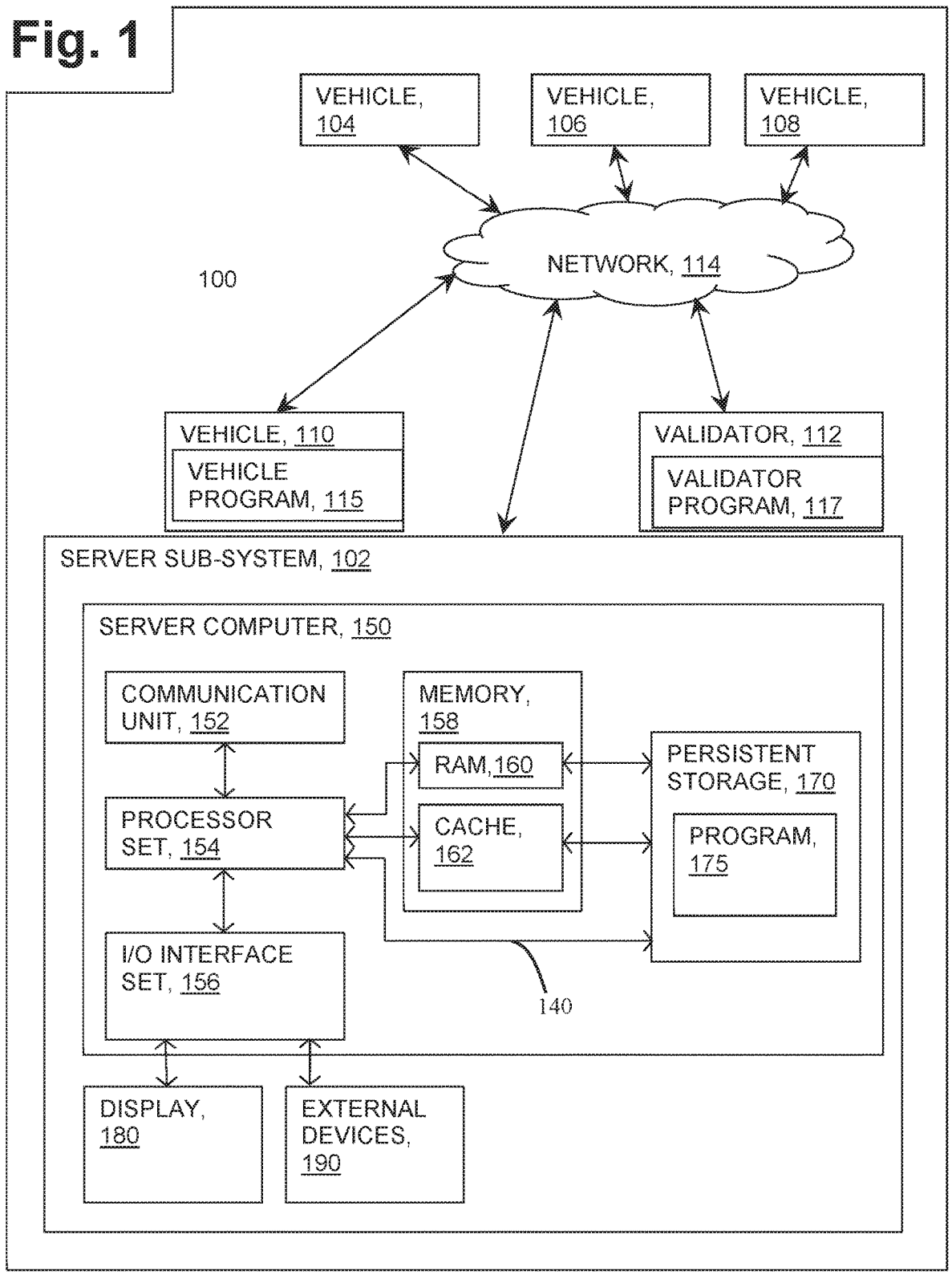
FIG. 1 provides a schematic illustration of a system, according to an embodiment of the invention.

Autonomous vehicles will follow software coded rules of the road, or regulations, created by local, state, national and international regulatory bodies. These regulations may vary from one geopolitical area to the next, as well as by type of vehicle, vehicle use, vehicle occupant type or road type, requiring vehicles to change from one set of regulations to another as the vehicle crosses boundaries from one geopolitical area to the next, changes passengers, or other vehicle characteristics. The regulations will be subject to change, further requiring vehicles to maintain up-to-date regulations to avoid issues. The operating regulations may be subject to tampering to alter the operation of a vehicle or to eliminate operating data, thereby requiring a mechanism to verify not only that the current regulatory software is valid and up-to-date, but also that all previous software versions used by the vehicle were also valid and up to date. Blockchain data provides a means to record the vehicle's software history as well as a way to enable vehicles to validate software updates prior to use.

Current vehicle software update systems provided by manufacturers include manual systems wherein a vehicle must be taken to a dealer, connected to a host computer with a wired connection to then have updated software loaded onto the vehicle computer processor. No validation of the update or ongoing record of all updates or modifications to the vehicle software is maintained across a network. This system relates only to control software associated with the mechanical operation of the vehicle systems and not autonomous vehicle regulatory compliance.

The disclosed methods and systems provide an improved functionality for distributing regulatory software by also providing secure validation of the distribution and tracking the history of software packages utilized by networked vehicles.

In an embodiment, the system of the invention comprises a network of communicating nodes. Vehicle nodes include autonomous vehicles covered by the regulations. The vehicle nodes communicate with the network by broadcasting and receiving information relating to the vehicle's current and destination locations as well as information relating to the current use of the vehicle, the passengers, and other vehicle characteristics. At least a portion of the vehicle information may be contained in a ledger entry associated with the vehicle and maintained in a blockchain by the system. Validation nodes provide selective endorsement of vehicle update transactions memorialized in blockchain ledger entries. Validation nodes (validators) may comprise government, vehicle dealer and manufacturer sites. These sites may also serve as update provider sites where vehicles may connect and download software updates for immediate or future use. Mirrors of these sites may also provide access to updated software while not necessarily being validators. In this embodiment, vehicle nodes may also serve as validator nodes for transactions of other vehicles. In this embodiment, the system comprises administration nodes which track software update availability, provide access to new software, as well as vehicles using information broadcast by the vehicles. Validation, vehicle, and administrative nodes comprise network computing resources and may include local computers and servers as well as remote cloud resources.

The blockchain may comprise a private blockchain ledger where the identities of the participants are known to each other. The blockchain may be created using the open source hyperledger or Ethereum blockchain scripting platforms, or other blockchain platforms. Each participant has an identification (id) and a digital signature. The combination of the id and digital signature may be used to authenticate any transaction. In an embodiment, each transaction carries a transaction id, the originator id and the originators digital signature which is encoded using a private key of the originator and the transaction id. The originator id, or originator public key, may then be used to decrypt the transaction id from the digital signature authenticating the origin of the transaction. In the private blockchain, the size of each block is predetermined. When the predetermined size limit is reached, a new block is created incorporating a hash of the previous block.

In an embodiment, each geopolitical zone maintains a database of regulation packages accessible for download by users/vehicles. The database may be accessed by networked nodes. Vehicles residing in the zone, registered with the zone, or intending to travel in the zone, may access the repository and download the most current regulations for use. Access may be via the providing nodes or by a direct connection to the database to download the new regulatory package. In this embodiment, a notice that a software update is available and necessary for a particular zone may be sent from an administrative system of the zone to all vehicles currently registered for, or present within the zone. Such vehicles may then download the software or agree to receive a download of the software pushed from the repository, a providing node, or a mirror site. In this embodiment, the vehicle will receive the regulation package as well as metadata regarding the source from which the package was received. Metadata may include the repository id, the date and time of the download, and the package version number. Immediately prior to use of the package, the vehicle may seek validation of the package. The request may include a data hash of the regulatory package, vehicle identification information and metadata associated with the download of the package. One or more validators may provide validation by comparing the hash of the package provided by the vehicle, along with the package metadata, with information from the repository. This includes comparing the submitted data hash with a hash of the data the validator has made after downloading the package from the download source, or with a hash of the package downloaded from the source, as well as comparing the date and time information submitted by the vehicle with download records of the repository. Transactions found to be valid are memorialized in the blockchain ledger with the ledger entry communicated to the vehicle for subsequent use determining when another update is required.

In an embodiment, a blockchain ledger is provided wherein ledger entries are maintained according to software providing entities, (e.g., Regulatory bodies, vehicle dealers, and manufacturers) as well as vehicles. In this embodiment, the providing entity ledger entries include the block number, time stamp, entity id, chaincode data, as well as designation and version information for the available software based upon vehicle type presented as a data hash of the software. The ledger entry may also include information regarding the geopolitical zone to which the software is applicable. As an example, the ledger entry may include information that the software is applicable to all vehicles operated in the United States, or a single state, or a particular city or metropolitan area. In this embodiment, vehicle ledger entries include the block number, previous software hash, current software hash, vehicle id, chaincode data, current software validator digital signatures, and software provider digital signatures. The digital signatures may comprise data encrypted using a private key which may be decrypted for comparison in an authentication step.

In an embodiment, the respective providing entity, administrative and vehicle nodes may communicate with each other and interact with the ledger. For stationary nodes this communication may be over wired or wireless network paths. For vehicle nodes, the communication may be enabled by use broadband communications such as 4G and 5G cellular networks, WIFI networks, satellite networks, or other wireless communication networks including the Dedicated Short-Range Communications (DRSC) network.

In an embodiment, providing nodes may update their ledger entries to include information about new software versions, a hash of the new software version, along with associated requirements for update timing and vehicle type.

The providing node informs the Administrative node of the update. In some embodiments, the providing and administrative nodes may be identical. The Administrative node may send a notice to all vehicle nodes currently registered with the Administrative node, or currently known to be located within the relevant zone, that an update is available and necessary. Absent a push notification from an Administrative node, a vehicle queries the ledger to determine if the providing node of the current vehicle regulatory software has posted a new version necessitating an update request. In this embodiment, the vehicle query may occur each time the vehicle is started or at a frequency controlled by the owner of the vehicle or at a frequency required by the regulations.

In an embodiment, vehicle nodes may communicate with each other using wireless communication protocols as described above. Each vehicle broadcasts its information including information regarding current regulatory packages and location zone. In this embodiment, a need for a regulatory software update may be triggered by comparing the information received from a vehicle node with the information of the receiving vehicle and determining that the receiving vehicle's regulatory package is not current.

In an embodiment, the vehicle node may determine a need for updating regulatory software according to the location of the vehicle or a destination submitted to the vehicle navigation system. As an example, Alice may utilize her vehicle's navigation system to route her from a first geopolitical zone (Zone A) to a second geopolitical zone (Zone B) where Zone A and Zone B have differing vehicle regulations and therefore different vehicle regulatory software packages. Alternatively, an on-board system may utilize global positioning system (GPS) data to determine that the vehicle is enroute from Zone A to Zone B and about to traverse the boundary between the two zones. In each instance, the on-board system may determine a need for a software update by utilizing a database containing data on the respective regulatory schemes including the geographic limits of each of the schemes, as well as the information contained in the current ledger entry for the vehicle including the details associated with the current vehicle regulatory schema. As noted above, the system may simply switch between two software packages already resident in the vehicle system. Alternatively, the system may determine that the vehicle lacks the appropriate software as either no appropriate regulatory package is present or the package which is present is out-of-date. In this embodiment, the system requests a software update to provide the necessary package.

Other circumstances which may trigger a need to update software, including a need to validate the downloaded software, include a change in the type of use of a vehicle for example a change from personal use to commercial use by a vehicle used part-time in a commercial ride sharing system. The nature and number of passengers may trigger a need for a review and possible update of regulations as the regulations may differ for persons with disabilities or for vehicles carrying one passenger versus multiple passengers where car-pool lanes are present.

After a vehicle determines that an update is needed, the vehicle may determine that the appropriate software is already resident in the vehicle system storage or download the updated software directly from a providing node, or a mirror site of the providing node. In an embodiment, the software request includes vehicle identity information including network location as well as an indication of the providing entity and software package(s) needed. The request triggers a download of the requested file from either the providing node, or a designated mirror of the providing node. Such designated mirror nodes enable the handling of a higher volume of update requests. The software package is provided together with the id of the download site, a time stamp and other metadata including site location. A hash of the package is provided to facilitate validation of the downloaded software. A hash function such as: Sha-1, Sha-2 or Sha-256 provides the hash value of the software package. Once the package has been received, the vehicle requests validation from at least one network validator to ensure that the received software is valid.

In an embodiment, validation request may take the form of a ledger entry submitted by the vehicle. Table 1 contains exemplary data fields from such a ledger entry including the vehicles previous package hash, the new package hash, the vehicle id and digital signature, a transaction id (Trxid), a time stamp, chaincode information including Chaincode Id and signature, transaction data (trx data) including regulation ID, a hash of the regulation and regulation provider ID information, and a smart contract requesting validation of the package download transaction and notice of the validation.

TABLE 1

| Block number | Previous hash | Data hash |
|---|---|---|
| Trx Id | Time stamp | |
| Chaincode data (Chaincode Id and signature, trx data[regulation Id, hash, regulation provider Id]) | | |
| Validator ID | Validator Signature | |
| Validator ID | Validator Signature | |
| Creator ID | Signature | Smart contract |
| Creator ID | Signature | Smart contract |

In this embodiment, validating nodes compare the new hash and metadata associated with the transaction provided by the requesting vehicle with the corresponding information at the download site. A favorable comparison—the data values are identical—results in a selective endorsement of the transaction, and a new ledger entry being written for the vehicle completing the smart contract and indicating that the update is valid. The ledger entry includes the id and digital signature of the validating node. The digital signature of the validating node may be used to authenticate the origin of the validation. The validation results and new ledger entry are communicated to the requesting vehicle and written to the blockchain ledger. In an embodiment, the communication and writing of the ledger entry are accomplished by the validator. In an embodiment, the communication and writing are accomplished by an administrative node. In this embodiment, the administrative node receives the ledger entry validation request from the vehicle node and passes it on the set of network validation nodes by updating the ledger. The administrator may note each successful validation in the new ledger entry which is written and communicated to the vehicle node.

In an embodiment, the successful validation communication triggers the vehicle to update the current software package to the downloaded package and thereafter utilize the updated package to control the vehicle in the relevant geopolitical zone. In this embodiment, the vehicle broadcasts the new ledger entry together with current vehicle information.

In an embodiment, after a request for validation fails, the smart contract of the ledger entry request written by the vehicle yields a notice of validation failure to the vehicle rather than notice of success. After receiving the failure notice, the vehicle may download the regulatory package again and submit a new smart contract ledger entry request seeking validation of the new package.

In an embodiment, a vehicle ledger entry may include a plurality of regulatory software entries each associated with a unique geopolitical zone. In this embodiment, each entry comprises the last validated package. The plurality of entries enables the vehicle to quickly change from one software package to another based upon location with the need to repeatedly download software packages. As an example, Bob commutes across an international border between Detroit Mich., USA and Windsor Ontario, Canada. The ledger entry for Bob's car indicates an up-to-date software package for each of Michigan, USA and Ontario, Canada allowing the car to switch to the appropriate software each time Bob crosses the border without a need to download the software twice each work day. In this embodiment, once the multiple regulatory packages are validated, the vehicle need not download the packages at each crossing until one or more of the packages becomes out-of-date.

The ledger may be queried according to providing nodes or zones to determine the current regulatory version for the zone, as well as to determine the history of package updates. The ledger may be queried according to vehicle identification to determine the current regulatory package associated with a particular vehicle as well as to review the regulatory package use history of the vehicle. In an embodiment, the regulatory package history may be reviewed to ensure that only valid regulatory packages have been used by the vehicle.

In an embodiment, a network comprises nodes including an ordering service, peers, and clients each capable of wireless network communications with the other network nodes. The ordering service provides communication services between nodes including sequencing proposed transactions for broadcast to peer nodes such that each peer node reviews all proposed transactions in the same order as all other peer nodes. The ordering service may be provided by regulatory bodies or agents of the regulators. The ordering service may reside on a network server or other network device. The ordering service may comprise a logical partition of the network device rather than the entire device. The client nodes submit proposed transactions for validation and represent the end users of the system. Client nodes comprise vehicles having network communication capabilities. Peer nodes provide review and validation of the proposed transactions by selective endorsement after validating the identity of the client, and the actual transaction data. Client nodes and the ordering service may also function as peer nodes in the network. Software providing nodes serve to enable vehicles access to actual regulatory package software for downloading. These provider nodes may also function as peer nodes and the ordering service of the system.

Chaincode is deployed to the nodes. The chaincode defines the nature of the blockchain including specifying which nodes may endorse transactions and the details of an endorsement policy for the transactions of the ledger. The endorsement policy specifies how many peers must endorse the transaction.

After determining that an update is needed and downloading the necessary software package as described above, the vehicle (client node) submits a proposed transaction to the other network nodes regarding a software update package needed for operation. The proposed transaction is submitted to the group of validating, or endorsing, peers. The submission may be direct to the network of peers or indirectly through a single peer to the others. The proposed transaction provides information regarding the vehicle as well as the software package proposed for use by the vehicle (e.g. The version of the package, and meta data regarding the source and downloading the of the package (timestamp, IP address, etc.) and a digital signature of the client vehicle.

The peers authenticate the identity of the vehicle and the validity of the download transaction using information provided in the proposed transaction and information from the download source site. Peers authenticate the client using the client's digital signature and ID provided in the proposed transaction. Peers then validate the downloaded software by comparing the download meta-data in the proposed transaction with download meta data from the identified originating download site. Peers endorse validated transactions, digitally sign and return the signed transaction to the client vehicle. After receiving enough endorsements to satisfy an applicable endorsement policy, the client submits the now endorsed transaction to the ordering service. The submission may be made directly to the ordering service or indirectly through a network peer.

The ordering service broadcasts the endorsed transaction to the network peers. The ordering service provides a transaction sequence identifier and increments the identifier after the broadcast of each transaction. The peer nodes review transactions in order according to the provided identifier. The peers receive the ordered transaction, authenticate and validate it and commit the transaction by writing it to the state of the ledger. Invalid transactions are not validated, and though noted as invalid, they are not written to the state of the ledger. As transactions are ordered, and are considered and added in the correct order, the state of the ledger of the peers is the same. In one embodiment, the peers create a validated ledger, wherein only valid transactions are added to the validated ledger; notations regarding invalid transactions are not part of the validated ledger. The ordering service may also maintain a copy of the ledger.

After the proposed transaction requesting validation of the update is committed to the ledger and viewed by the client vehicle, the vehicle installs and begins using the software package. A new transaction is proposed by the vehicle including the information that the vehicle is now using the software. This transaction proceeds through the same process to be endorsed and sent to the ordering service, broadcast and ultimately committed to the ledger.

In an embodiment, use of the new software includes controlling vehicle operational aspects including vehicle following distance, speed, braking, steering, run-signal use and control of exterior lights.

In an embodiment, a network node deploys programmed instruction including chaincode establishing a ledger and defining an endorsement policy for ledger transaction. Responsive to the deployment, a client node proposes a transaction to a peer node regarding a downloaded regulatory software package. The peer node receives the proposed transaction and executing programmed instructions, authenticates the client using the digital signature and client ID provided in the proposed transaction, responsive to the authentication, the peer executes programmed instructions to validate the transaction using transaction information and information obtained from a download site identified in the transaction. Responsive to the validation, the peer node executes programmed instructions to communicate the successful validation to the client node. Responsive to receiving sufficient validation communications to satisfy the endorsement policy, the client node executes programmed instructions to transmit the endorsed transaction to an ordering service. Responsive to receiving the endorsed transaction, the ordering service executes programmed instructions to increment the transaction ID by one and then broadcast the endorsed transaction to peer nodes. Responsive to receiving the endorsed transaction, the peer nodes execute programmed instructions to authenticate the transaction using a digital signature from the ordering service and other transaction information. The peer nodes review the transactions in order according to their transaction ID. Validated and authenticated transactions are committed to the ledger. The new ledger state includes the new transaction as well as a hash of the previous state of the ledger. Responsive to the new state of the ledger, the client updates its software and begins using the new software. The client proposes a new transaction indicating its use of the new software. The new transaction is authenticated, validated, and committed to the ledger using the process described above.

In an embodiment, illustrated in FIG. 1, a system generally noted as 100, comprises a server subsystem 102 and a plurality of networked client devices including vehicles 104, 106, 108, 110, and validator 112. The networked client and devices 104, 106, 108, 110, and 112 communicate wirelessly with the server and with each other utilizing network 114. Networked client devices 104, 106, 108, and 110, comprise client vehicle software distribution program depicted as reference item 115 for vehicle 110. Vehicle software distribution program 115 controls the execution of vehicle centric steps of the disclosed methods. Validator nodes 112 comprise validator software distribution program 117 which controls the aspects of the disclosed inventions executed by the validator node(s) 112. Validator software distribution program 117, vehicle software distribution program 115 and software distribution program 175 may be individually distinct programs or may be a common program comprising multiple execution aspects to accommodate the activities of the server (administrative), validator and vehicle nodes.

As shown in FIG. 1, server subsystem 102 comprises a server computer 150. FIG. 1 depicts a block diagram of components of server computer 150 within distributed data processing environment 100 of FIG. 1, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, including random access memory (RAM) 160 and cache memory 162, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM). In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the software distribution program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, 106, 108, 110, and 112. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., software distribution program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Server subsystem 102 together with software distribution program 175 may be utilized in systems and methods as validation, providing, and administrative nodes. The server subsystem 102 may be used for vehicle nodes or a less complex system may be used for vehicle nodes comprising less computational resources and a tailored vehicle specific version of software distribution program 175 denoted as vehicle software distribution program and depicted in FIG. 1 as reference item 115.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
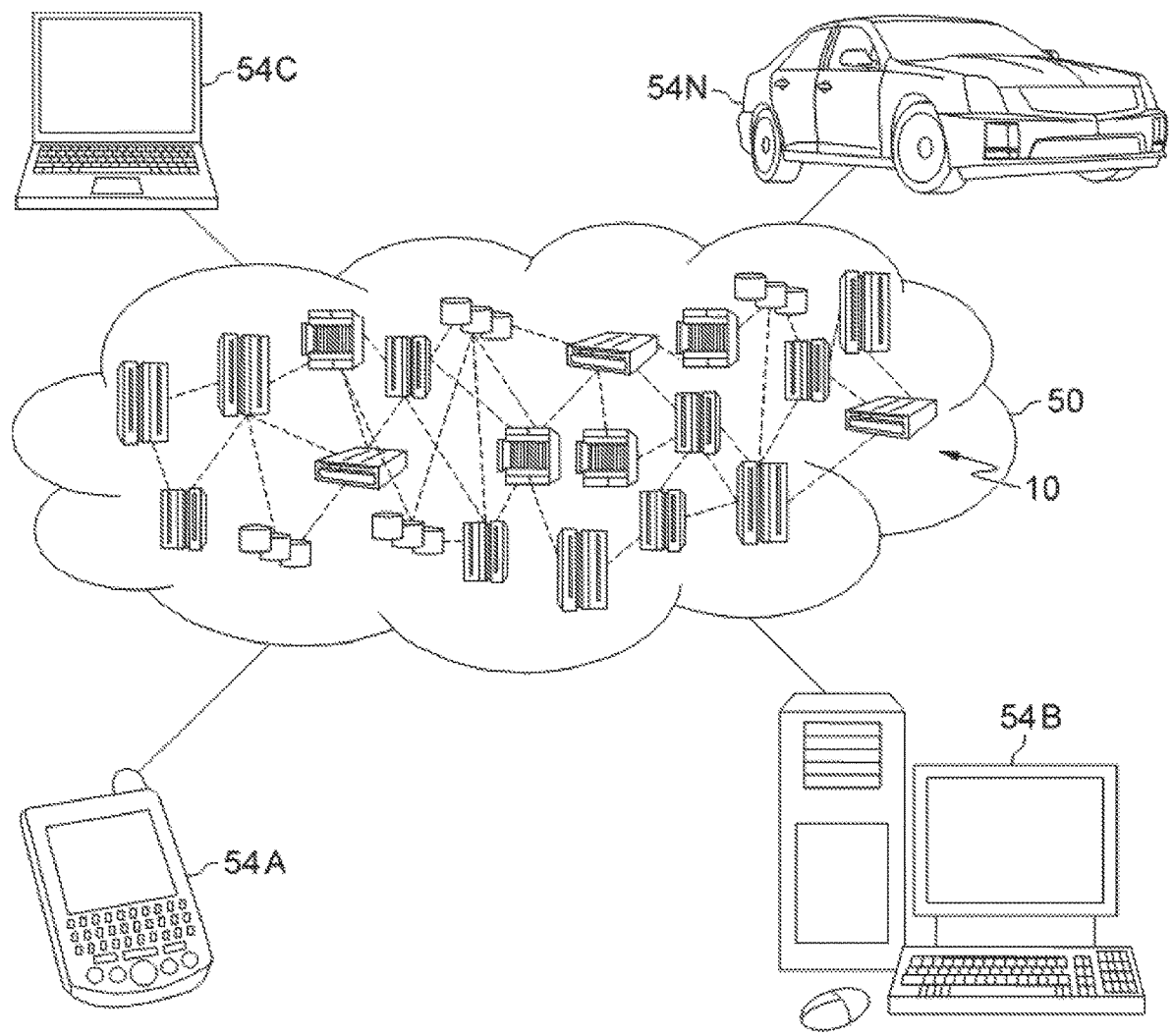
FIG. 2 depicts a cloud computing environment, according to an embodiment of the invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
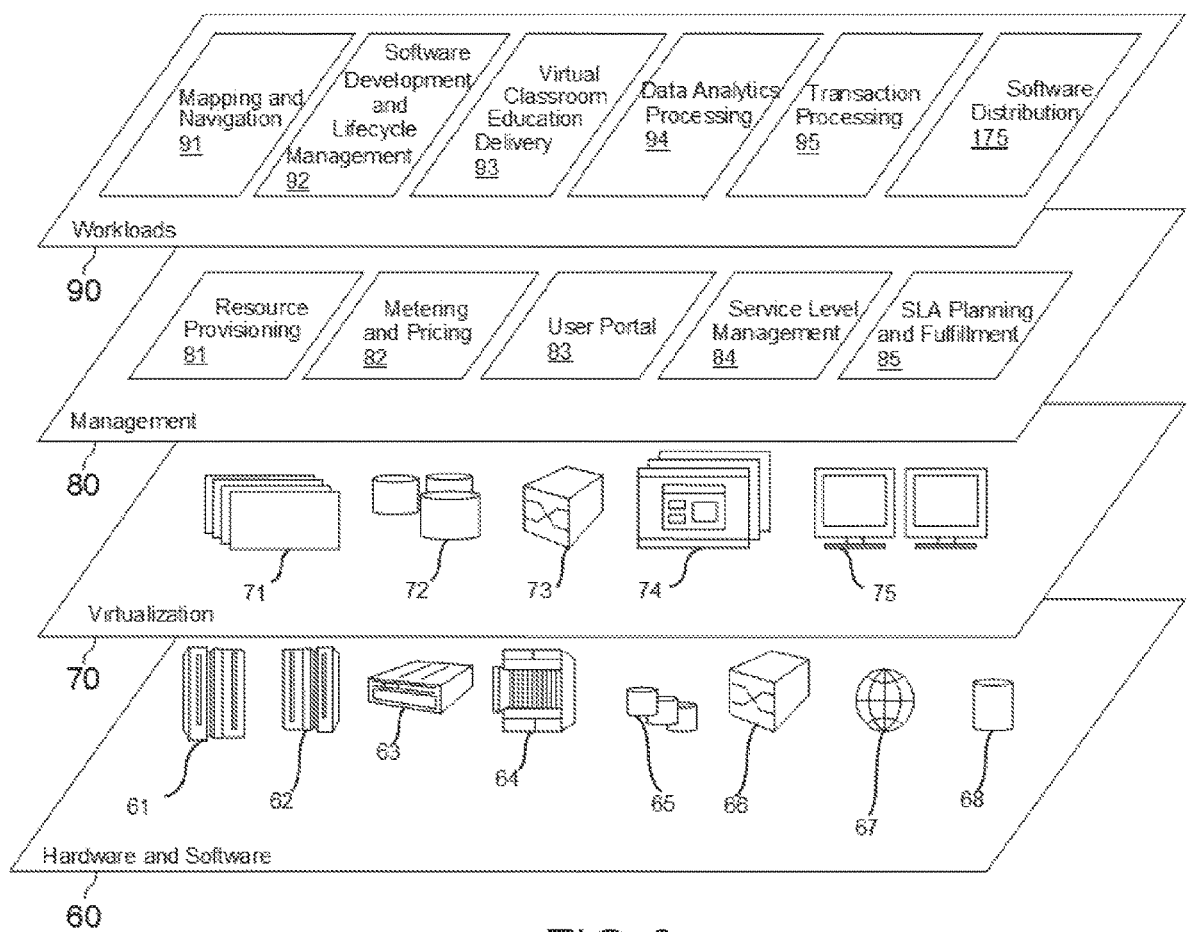
FIG. 3 depicts abstraction model layers, according to an embodiment of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software distribution program 175.

Figure 4:
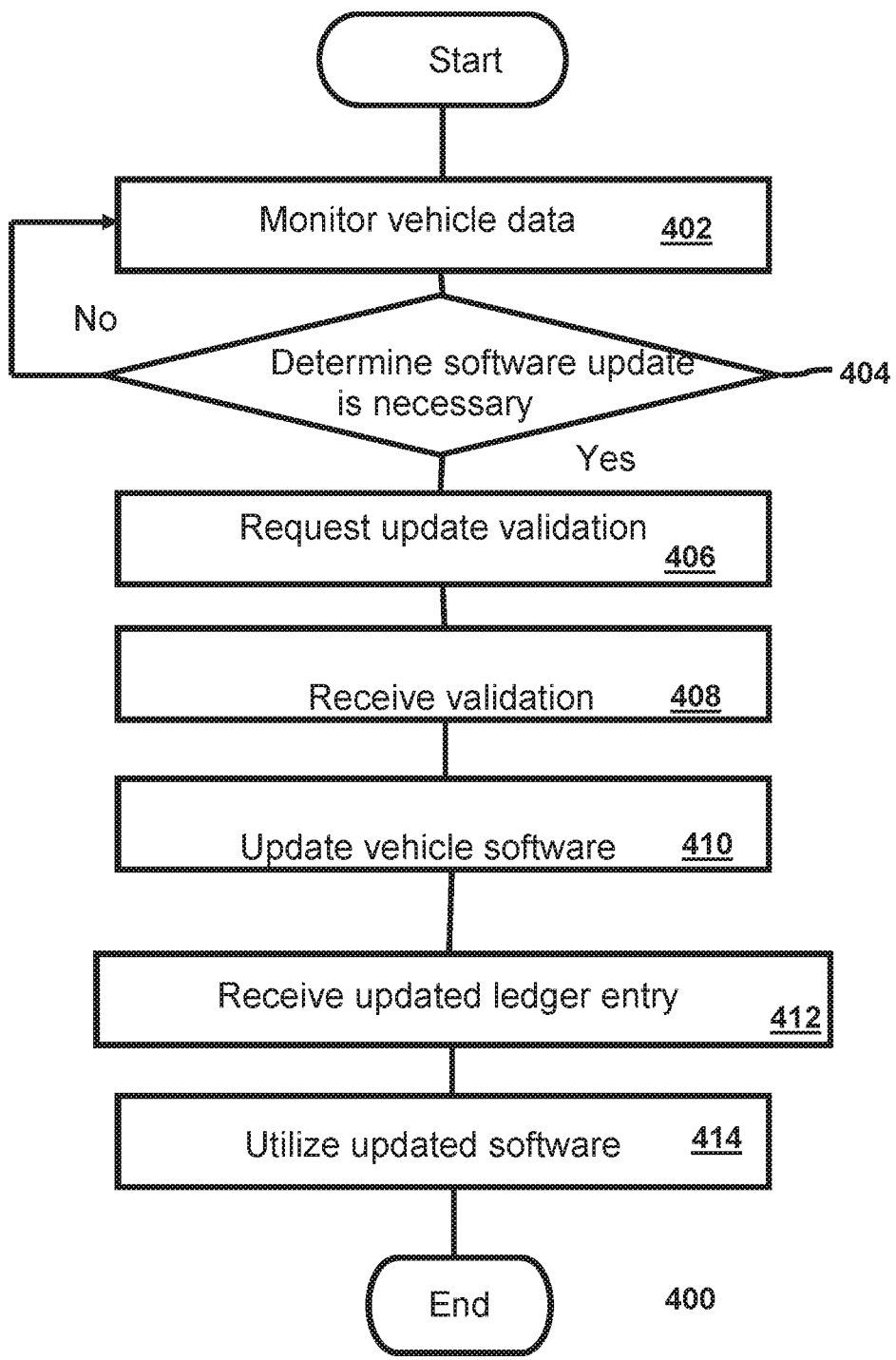
FIG. 4 provides a flowchart depicting operational steps, according to an embodiment of the invention.

The flowchart of FIG. 4 depicts the steps of an embodiment of the invention referred to generally as reference item 400. After Start, vehicle software distribution program 115 of FIG. 1, monitors vehicle data at step 402. The vehicle data may include the vehicle's current and destination locations as well as information relating to the current use of the vehicle, the vehicle occupants, current regulatory software packages, and other vehicle characteristics. The data may be maintained in a blockchain ledger entry, a copy of which may be held by the vehicle. The vehicle information may be monitored locally by the vehicle itself, or remotely by a system monitoring information broadcast by the vehicle executing software distribution program 175.

At step 404, the vehicle information is checked by vehicle software distribution program 115 to determine if the current regulatory software package is satisfactory or if an update is needed. This determination may be made by comparing version values for the current package with values for a destination zone or for the current zone, checking against a repository of current regulatory package versions.

If no update is needed, monitoring of the vehicle information resumes. If an update is needed, a check for the presence of the necessary software is made (not shown). If the software is not present, steps are taken to download the necessary software. Once the software is present, a validation of the new software is requested by vehicle software distribution program 115 at step 406. This step is taken to ensure that the vehicle utilizes only valid software packages. The request may be made as a proposed ledger entry comprising a smart contract. The ledger entry provides a transaction id, the data hash and metadata of the current package, the vehicle id, including the vehicle's network location, and vehicle digital signature, and a smart contract regarding validation results.

A network validator authenticates the vehicle request using the transaction id, the vehicle id and the vehicle digital signature and vehicle software distribution program 115.

The vehicle software distribution program 115 of the validator then validates the software package using the data hash and package metadata. The vehicle software distribution program 115 of the validator then commits the ledger entry validating the update transaction and satisfying the smart contract of the request. The ledger entry includes the digital signature of the validator. A response may be sent by vehicle software distribution program 115 to the requesting vehicle, or the vehicle may monitor the ledger and find the new ledger entry validating the update, vehicle software distribution program 115 of the vehicle receives the validation at step 408.

At step 410, vehicle software distribution program 115 updates the regulatory software for operational use controlling the vehicle's activities. The vehicle may propose a new ledger entry indicating that the update for which validation was requested has been installed and is in use. This ledger entry may also be validated using the vehicle digital signature and id information as described above, with a validated version of the entry being written and passed to vehicle software distribution program 115 at step 412. After this ledger entry is received by the vehicle, the new regulatory package may be utilized by the vehicle software distribution program 115 at step 414.

Figure 5:
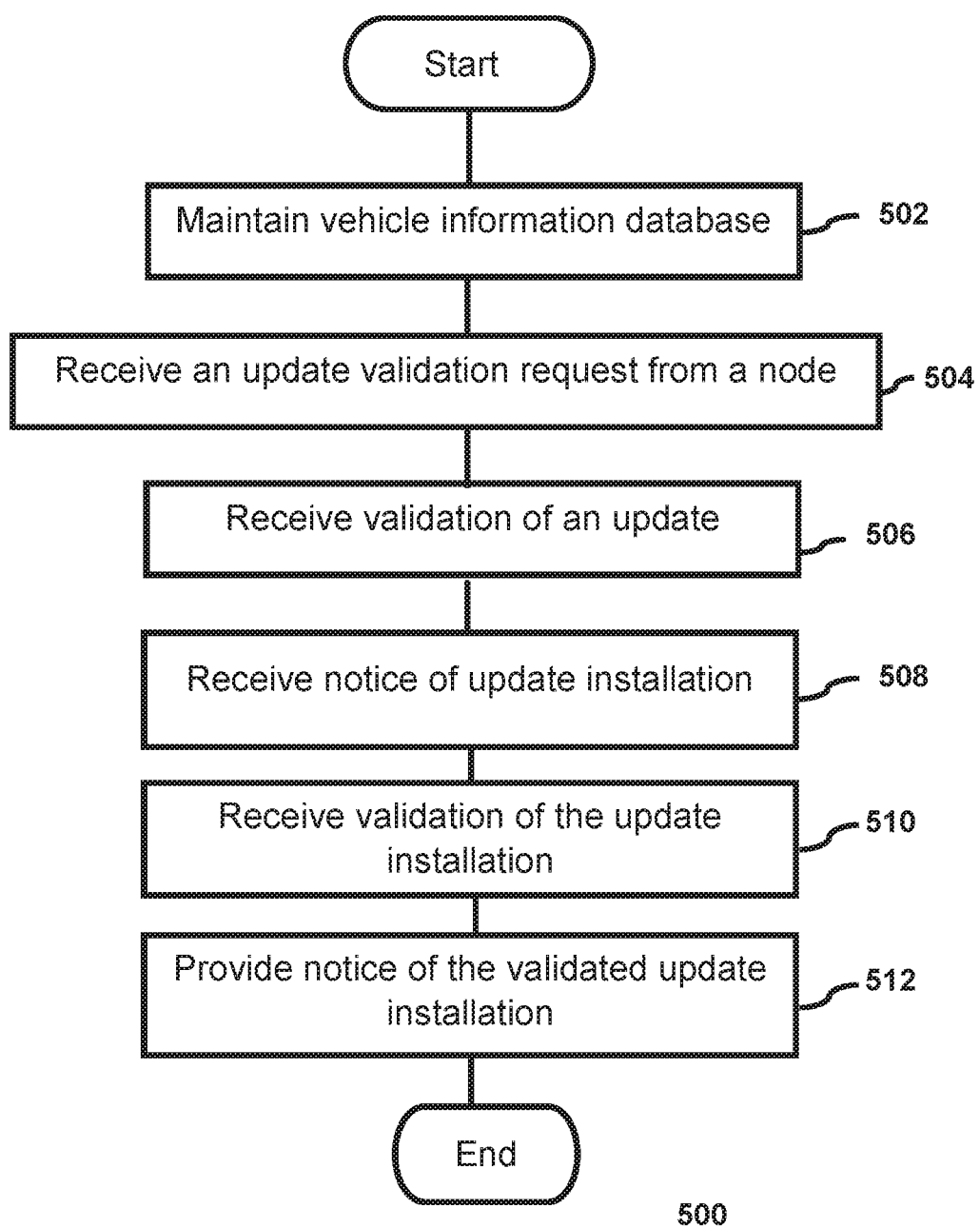
FIG. 5 provides a flowchart depicting operational steps according to an embodiment of the invention.

The flow chart of FIG. 5 depicts steps of an embodiment of the invention generally referred to as reference item 500. A database of vehicle information is maintained by software distribution program 175 at step 502. The database may be maintained in the form of a distributed ledger or blockchain. The blockchain may be private and all participants may be known and visible to each other. A ledger entry comprising a request for validation of a regulatory software download transaction may be proposed to the blockchain by vehicle software distribution program 115 and received by software distribution program 175 at step 504. At step 506, software distribution program 175 receives a ledger entry validating the update transaction as authentic using information provided in the ledger entry of step 504 written by software distribution program 175 of at least one validator node.

Responsive to the validation entry of step 506, a ledger entry indicating installation of the validated software update is written by vehicle software distribution program 115 and received by software distribution program 175 at step 508. This entry is validated as authentic by validator software distribution program 175 using vehicle information contained in the ledger entry and software distribution program 175 receives notice of the validation at step 510, appropriate ledger entries indicating the validation are written as each validator adds its selective endorsement of the transaction and a validation digital signature.

At step 512, software distribution program 175 makes the requesting vehicle aware of the validation of the update installation ledger entry. The notice may be passive wherein the vehicle reads the validation ledger entries or may be active wherein a response is sent to the vehicle as part of the smart contract of the initial request.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for securely updating vehicle software comprising:
    monitoring, by one or more vehicle computer processors, data associated with a vehicle;
    determining, by the one or more vehicle computer processors, that a software update is necessary;
    requesting, by the one or more vehicle computer processors, validation of update software from a plurality of validating peers;
    receiving, by the one or more vehicle computer processors, validation of the update software from enough of the plurality of validating peers to satisfy an endorsement policy;
    responsive to receiving validation of the update software from enough of the plurality of validating peers to satisfy the endorsement policy, submitting, by the one or more vehicle computer processors, a proposed transaction including the update software, to an ordering service;
    receiving, by the one or more vehicle computer processors, an updated blockchain ledger entry associated with the vehicle from the ordering service;
    authenticating, by the one or more vehicle computer processors, the updated blockchain ledger entry;
    updating a blockchain ledger of the vehicle according to the updated blockchain ledger entry;
    responsive to updating the blockchain ledger entry according to the updated blockchain ledger entry, updating, by the one or more vehicle computer processors, vehicle software with the update software and
    utilizing, by the one or more vehicle computer processors, the update software to control the vehicle.

2. The computer implemented method according to claim 1, wherein monitoring, by the one or more vehicle computer processors, data associated with a vehicle comprises monitoring data selected from a group consisting of: vehicle location, vehicle type, vehicle characteristics, occupant information, road characteristics, current software information, vehicle destination information, date and time information.

3. The computer implemented method according to claim 1, wherein determining, by the one or more vehicle computer processors, that a software update is necessary comprises determining that a vehicle will traverse a boundary into a geopolitical zone for which the vehicle needs a software update.

4. The computer implemented method according to claim 3, wherein determining, by the one or more vehicle computer processors, that the vehicle will traverse a boundary into a geopolitical zone for which the vehicle needs a software update comprises utilizing destination information from a vehicle navigations system to determine that the vehicle will traverse a boundary into a geopolitical zone for which the vehicle needs a software update.

5. The computer implemented method according to claim 1, wherein determining, by the one or more vehicle computer processors, that a software update is necessary comprises determining that current software for a vehicle location is out-of-date.

6. The computer implemented method according to claim 1, wherein determining, by the one or more vehicle computer processors, that a software update is necessary comprises receiving a push notification for an update.

7. The computer implemented method according to claim 1 further comprising:
    requesting, by the one or more vehicle computer processors, updated software from a system; and
    receiving, by the one or more vehicle computer processors, a software update from a blockchain network.

8. The computer implemented method according to claim 7, wherein the step of requesting, by the one or more vehicle computer processors, updated software from a system comprises sending a request for updated software including a vehicle signature to a providing node.

9. The computer implemented method according to claim 1, wherein the step of receiving, by the one or more vehicle computer processors, validation of the software update from the network comprises receiving selective endorsement of the update from a validator.

10. The computer implemented method of claim 1 wherein the step of utilizing, by the one or more vehicle computer processors, the software update to control the vehicle comprises controlling an aspect of the vehicle's operation selected from a group consisting of: steering, braking, acceleration, following distance, and lane changing.

11. A computer system for updating vehicle software, the system comprising:
   one or more computer processor;
   one or more computer readable storage device; and
   program instructions stored on the one or more computer readable storage devices for execution by the at least one computer processor, the program instruction comprising:
      program instructions for monitoring data associated with a vehicle;
      program instructions for determining that a software update is necessary;
      program instructions for requesting validation of update software from a plurality of validating peers;
      program instructions for receiving validation of the update software from enough validating peers to satisfy an endorsement policy;
      program instructions for submitting a proposed transaction including the update software, to an ordering service, in response to receiving validation of the update software from enough of the plurality of validating peers to satisfy the endorsement policy;
      program instructions for receiving by the vehicle, an updated ledger entry associated with the vehicle from the ordering service;
      program instructions for authenticating the updated blockchain ledger entry;
      program instructions for updating the vehicle software with the update software; and
      program instructions for utilizing the update software to control the vehicle.

12. The computer system for updating vehicle software according to claim 11, wherein the programmed instructions for monitoring data associated with a vehicle comprises monitoring data selected from a group consisting of: vehicle location, vehicle type, vehicle characteristics, occupant information, road characteristics, current software information, vehicle destination information, date and time information.

13. The computer system for updating vehicle software according to claim 11, wherein determining that a software update is necessary comprises determining that the vehicle will traverse a boundary into a geopolitical zone for which the vehicle needs a software update.

14. The computer system for updating vehicle software according to claim 11, wherein requesting updated software from a system comprises sending a request for updated software including a vehicle signature to a providing node.

15. The computer system for updating vehicle software according to claim 11, wherein receiving validation of the update software from the network comprises receiving selective endorsement of the update software from a validator.

16. A computer program product for distributing software, the computer program product comprising one or more computer readable storage devices and program instructions stored on the one or more computer readable storage devices, the program instructions comprising:
   program instructions for monitoring data associated with a vehicle;
   program instructions for determining that a software update is necessary;
   program instructions for requesting validation of update software from a plurality of validating peers;
   program instructions for receiving validation of the update software from enough validating peers to satisfy an endorsement policy;
   program instructions for submitting a proposed transaction including the update software, to an ordering service, in response to receiving validation of the update software from enough of the plurality of validating peers to satisfy the endorsement policy;
   program instructions for receiving by the vehicle, an updated ledger entry associated with the vehicle from the ordering service;
   program instructions for authenticating the updated blockchain ledger entry;
   program instructions for updating the vehicle software with the update software; and
   program instructions for utilizing the update software to control the vehicle.

17. The computer program product for updating vehicle software according to claim 16, wherein the programmed instructions for monitoring data associated with a vehicle comprises monitoring data selected from a group consisting of: vehicle location, vehicle type, vehicle characteristics, occupant information, road characteristics, current software information, vehicle destination information, date and time information.

18. The computer program product for updating vehicle software according to claim 16, wherein determining that a software update is necessary comprises determining that the vehicle will traverse a boundary into a geopolitical zone for which the vehicle needs a software update.

19. The computer program product for updating vehicle software according to claim 16, wherein requesting updated software from a system comprises sending a request for updated software including a vehicle signature a providing node.

20. The computer program product for updating vehicle software according to claim 16, wherein receiving validation of the update software from the network comprises receiving selective endorsement of the update software from a validator.

* * * * *